United States Patent
Cui et al.

(10) Patent No.: US 10,135,235 B2
(45) Date of Patent: Nov. 20, 2018

(54) DIGITAL GROUND-FAULT CIRCUIT INTERRUPTER

(71) Applicant: ABB Technology AG, Zurich (CH)

(72) Inventors: Tao Cui, Cary, NC (US); David Coats, Cary, NC (US); Emanuele Borla, Cerro al Lambro (IT)

(73) Assignee: ABB Schweiz AG, Baden (CH)

( * ) Notice: Subject to any disclaimer, the term of this patent is extended or adjusted under 35 U.S.C. 154(b) by 386 days.

(21) Appl. No.: 14/950,950

(22) Filed: Nov. 24, 2015

(65) Prior Publication Data
US 2017/0149235 A1    May 25, 2017

(51) Int. Cl.
*H02H 3/33*        (2006.01)
*H01H 83/04*      (2006.01)
*H02H 5/10*        (2006.01)

(52) U.S. Cl.
CPC ............ *H02H 3/338* (2013.01); *H01H 83/04* (2013.01); *H02H 5/105* (2013.01)

(58) Field of Classification Search
CPC ......... H02H 3/338; H02H 5/105; H01H 83/04
See application file for complete search history.

(56) References Cited

U.S. PATENT DOCUMENTS

| | | | | |
|---|---|---|---|---|
| 5,345,161 | A | * | 9/1994 | Zieve ...................... B21J 15/24 307/110 |
| 5,982,593 | A | * | 11/1999 | Kimblin ................. H02H 3/335 324/424 |
| 6,628,486 | B1 | | 9/2003 | Macbeth |
| 7,164,563 | B2 | | 1/2007 | Chan et al. |
| 7,239,491 | B1 | | 7/2007 | Morgan et al. |
| 7,751,162 | B1 | | 7/2010 | Packard et al. |
| 8,995,098 | B2 | | 3/2015 | Tomimbang |
| 2008/0007879 | A1 | * | 1/2008 | Zaretsky ................ H02H 3/335 361/42 |
| 2013/0188290 | A1 | * | 7/2013 | Tomimbang ......... H02H 11/002 361/115 |

* cited by examiner

*Primary Examiner* — Zeev V Kitov
(74) *Attorney, Agent, or Firm* — Taft Stettinius & Hollister LLP

(57) ABSTRACT

A GFCI circuit that includes an electronically controllable main switch that can turn on, and turn off, the delivery of electrical power from the GFCI circuit. The main switch is controlled and monitored by a microcontroller unit using at least digital input and digital output signals, and which includes analog to digital converter. The microcontroller unit may also use the on-off functionality of the main switch in connection with repeatable detection of miswiring of the GFCI circuit. The GFCI circuit can further be adapted to conduct a self-test that can temporarily disable the ability of a trip signal generated by a GFCI integrated circuit in response to a test fault to cause the tripping of the main switch. The microcontroller unit further monitors one or more characteristics of the GFCI circuit, including the main switch and trip signal(s), and can determine whether the GFCI circuit has reached its end-of-life stage.

19 Claims, 2 Drawing Sheets

DIGITAL GROUND-FAULT CIRCUIT INTERRUPTER

BACKGROUND

Embodiments of the present application generally relate to ground fault circuit interrupters. More particularly, but not exclusively, embodiments of the present application relate to digital ground fault circuit interrupter receptacles.

A ground-fault circuit interrupter (GFCI) is a safety device that typically shuts off an electric circuit when electric current is detected to at least potentially be flowing along an unintended path, such as, for example, when electric current is, or may possibly be, flowing through a person. Moreover, a GFCI can be a low voltage breaker/switch device, including a receptacle, that can often protect people from fatal or severe electric shock. Accordingly, certain safety and/or building codes and regulations mandate the use of GFCI receptacles in certain areas of many types of buildings. Thus, GFCI receptacles may be installed at a variety of locations inside, as well as outside, of various types of structures, particularly locations where the GFCI receptacle is in relatively close proximity to a water source and/or where at least occasional potential water exposure is anticipated. For example, GFCI receptacles are often installed on walls of kitchens and bathrooms, as well as used for outdoor receptacles on many homes and buildings.

GFCI products can be subject to a variety of codes, regulations, or standards, which may identify certain requirements or characteristics that GFCI receptacles should satisfy. For example, revised standard UL943 implements a number of changes relating to auto-monitoring, self-test functionality, and repeatable reverse line-load miswire detection functionality. Yet, many reverse line-load miswire detection features are directed to analog circuit solutions, such as, for example, capacitor charging/discharging during power up and burn out resistors. However, the burn-out resistor approach is typically a one-shot solution that is applicable during the first installation of the GFCI receptacle, and thus typically does not meet a repeatable miswire requirement for subsequent reinstallations. Additionally, analog circuits can generally be difficult to calibrate or monitor, be relatively inflexible, and are susceptible to noise and environmental interferences.

BRIEF SUMMARY

An aspect of an embodiment of the present application includes a ground fault circuit interrupter circuit that includes a main switch having one or more contacts, the one or more contacts being selectively displaceable between an open position and a closed position. The ground fault circuit interrupter circuit can also include a self-test circuit that is adapted to create a test fault in the ground fault circuit interrupter circuit and a ground fault circuit interrupter integrated circuit that is adapted to output a trip signal in response to the test fault. Additionally, the ground fault circuit interrupter circuit can include a test mode circuit that is adapted to issue a disable signal to prevent the one or more contacts from being tripped from the closed position to the open position by a test trip signal. A controller, which can include, or have the functionalities of, a microcontroller unit and/or an integrated circuit, can issue a test fault signal in response to the disable signal to generate a test fault in the ground fault circuit interrupter circuit. The controller can also issue the test trip signal in response to the test fault generated in the ground fault circuit interrupter circuit. Additionally, the controller can be adapted to monitor one or more characteristics relating to the test fault generated within the ground fault circuit interrupter circuit.

Another aspect of an embodiment of the present application includes a ground fault circuit interrupter circuit that includes a main switch that is adapted for the flow of electrical power from a line side to a load side of the ground fault circuit interrupter circuit when the main switch is in a closed position, and to prevent the flow of electrical power to the load side when the main switch is in an open position. The ground fault circuit interrupter circuit can also include a controller unit that is adapted to, upon at least an initial power up of the ground fault interrupter circuit, transmit a first signal to a first switch, that can include, but is not limited to, an interrupting device or a transistor, to initiate the main switch being changed from the closed position to the open position. Further, upon issuance of the first signal the controller, when electrically coupled to the external power source which correctly wired onto the line side of the ground fault circuit interrupter, is adapted to generate a second signal to a second switch, that can include, but is not limited to, an interrupting device or a transistor, to initiate the main switch being changed from the open position to the closed position. Additionally, upon issuance of the first signal from the controller, the main switch can be locked in the open position when the external power source is electrically connected to the load side rather than the line side of the ground fault circuit interrupter circuit.

Another aspect of embodiments of the present application includes a ground fault circuit interrupter circuit having a main switch that is electrically coupled to a line side and a load side. The main switch can have one or more contacts that are selectively displaceable between an open position and a closed position. Thus, electrical power can flow through the main switch from the line side to the load side when the one or more contacts are in the closed position, and not be delivered through the main switch to the load line when the one or more contacts are in the open position. The ground fault circuit interrupter circuit further includes a controller, which can include, or have the functionalities of, a ground fault circuit interrupter integrated circuit and a microcontroller unit, that is adapted to output a trip signal in response to detection of a fault by controller to initiate the displacement of the one or more contacts from the closed position to the open position. Additionally, the controller is adapted to output a first signal and a second signal during power up, the first signal issued to the main switch to initiate the displacement of the one or more contacts from the closed position to the open position, the second signal issued to the main switch initiating the displacement of the one or more contacts from the open position to the closed position.

BRIEF DESCRIPTION OF THE DRAWINGS

The description herein makes reference to the accompanying figures wherein like reference numerals refer to like parts throughout the several views.

Figure 1:
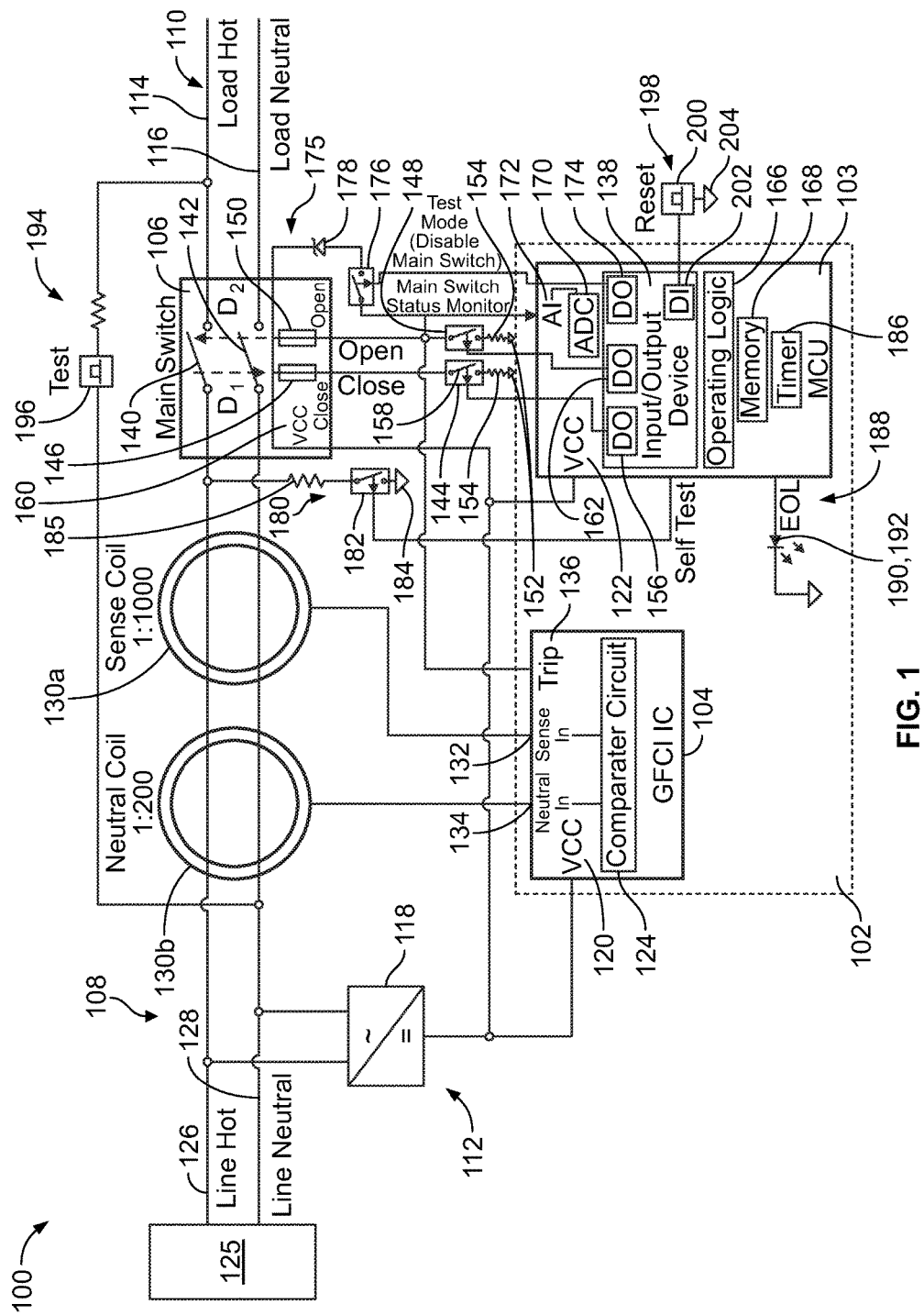
FIG. 1 illustrates an exemplary, and simplified, schematic of a GFCI circuit for a GFCI receptacle.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings. Further, like numbers in the respective figures indicate like or comparable parts.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

FIG. 1 illustrates an exemplary, and simplified, schematic of a GFCI circuit 100, such as, for example, a circuit for a GFCI receptacle, outlet, and/or socket. The GFCI circuit 100 can include a controller 102, and a main switch 106. Power can be delivered to the GFCI circuit 100 from an external power source 125, such as, for example, AC power from a utility power. According to the illustrated embodiment, the main switch 106 is positioned between a line side 108 and a load side 110 of the GFCI circuit 100. Further, as discussed below, the GFCI circuit 100 includes an internal power circuit 112 that is electrically connected to the line side 108 of the GFCI circuit 100. As discussed below, according to such an embodiment, the GFCI circuit 100 generally cannot be electrically powered up if the external power source 125 is wired to the load side 110, such as, for example, wired from the load hot output 114 and the load neutral output 116 of the load side 110, and the main switch 106 is in open position. Moreover, electrically connecting the external power source 125 to the load side 110, rather than the line side 108, of the GFCI circuit 100 will result in the GFCI circuit 100 being placed in, and/or remaining in, an open position during a below-discussed miswire detection process of the GFCI circuit 100.

According to certain embodiments, electrical power from the power source that is carried by the line side 108 of the GFCI circuit 100 may comprise AC electricity. Accordingly, the internal power circuit 112 of the GFCI circuit 100 can include an AC/DC power converter 118 that is electrically coupled to the line side 108 of the GFCI circuit 100, and which converts AC power to DC power. According to the illustrated embodiment, the converted DC power may be supplied to at least the controller 102. Additionally, according to certain embodiments, the controller 102 may include a ground fault circuit interrupter integrated circuit (GFCI IC) 104 and a microcontroller unit 103, which can, according to certain embodiments, be separate components having distinct functionalities. Alternatively, according to certain embodiments, rather than being unique components, such functionalities of the microcontroller 103 and the GFCI IC 104 may be integrated or merged into the controller 102. Thus, as illustrated in FIG. 1, according to certain embodiments, the AC/DC power converter 118 can be electrically coupled to the GFCI IC 104 and the microcontroller unit 103 by a wired connection(s) that delivers a positive voltage supply to voltage common collectors (VCC) 120, 122 of the GFCI IC 104 and the microcontroller unit 103, respectively, of the controller 102. Alternatively, according to other embodiments in which the functionalities of the microcontroller 103 and the GFCI IC 104 are integrated or merged into the controller 102, the AC/DC power converter 118 can be electrically coupled to the controller 102.

According to certain embodiments, the controller 102 and/or GFCI IC 104 can be an analog GFCI integrated circuit that includes a comparator circuit 124 that is adapted to evaluate detected currents in the line hot input 126 and the line neutral input 128 of the line side 108 of the GFCI circuit 100. For example, according to certain embodiments, the comparator circuit 124 may include a fault sensing circuit and a differential current transformer or sensor circuit, or other similar current sensors or circuits that are operably coupled to one or more sensor coils 130a, 130b. The sensor coils 130a, 130b may be wound coils through which one or both of the line hot input 126 and the line neutral input 128 pass, and which are structured for use in detecting a differential between the electrical current flowing through and returning to the GFCI circuit 100. According to the illustrated embodiment, the sensor coils 130a, 130b comprise a sense coil 130a and a neutral coil 130b that are electrically coupled to the controller 102 and/or GFCI IC 104, such as, for example, a wired connection to a respective sense coil input (Sense In) 132 and a neutral coil input (Neutral In) 134 of the controller 102 and/or GFCI IC 104. Further, according to certain embodiments, the sense coil 130a may have a coil turn ratio that is higher than a coil turn ratio of the neutral coil 130b. For example, in the illustrated embodiment, the sense coil 130a may have a coil turn ratio of 1:1000, while the neutral coil 130b has a coil turn ratio of 1:200.

The comparator circuit 124 may be adapted to detect or determine differences in the current information obtained from the sense and neutral coils 130a, 130b, such as, for example, detecting or determining a difference, if any, between electrical current flowing through the line hot input 126 and line neutral input 128. Such information from the comparator circuit 124 may be used by the controller 102 and/or GFCI IC 104 to determine whether to issue a trip signal that trips the main switch 106 so as to cease the delivery electrical power through the load side 110 of the GFCI circuit 100. More specifically, in situations in which the information detected or determined by the comparator circuit 124 indicates that current may be flowing along an unintended path, the controller 102 and/or GFCI IC 104 can be adapted to output a trip signal from a trip output 136 of the controller 102 and/or GFCI IC 104 to trip or break the GFCI circuit 100, and moreover place the main switch 106 in an open position, so as to stop the flow of current out from at least the load side 110 of the GFCI circuit 100.

The main switch 106 is adapted to control the flow of electrical current between the line side 108 and the load side 110 of the GFCI circuit 100, and thereby control the flow of electrical power out from the GFCI circuit 100. As discussed below, the main switch 106 is controlled by the controller 102 and/or microcontroller unit 103 through the use of digital electronics rather than via analog signals. By using digital electronics rather than analog signals, the main switch 106 can be controlled by the controller 102 and/or microcontroller unit 103 in a manner that is relatively more flexible and deterministic, as well as relatively less sensitive, if not immune, to electronic noise. The controller 102 and/or microcontroller unit 103 is further adapted to monitor the main switch 106, as discussed below. Further, according to certain embodiments, the main switch 106 can be adapted to electronically both turn-on and turn-off the GFCI circuit 100. According to certain embodiments, such turn-on and turn-off functionality of the main switch 106 can be controlled through the use of a digital input/output device 138 of the controller 102 and/or microcontroller unit 103, as well as by a trip signal outputted from the trip output 136 of the controller 102 and/or GFCI IC 104.

According to the embodiment depicted in FIG. 1, the main switch 106 can be, but is not limited to, a dual-coil latching relay or other switching or interrupting devices that is generally controllable to be turned on and turned off by controller 102 and/or microcontroller unit 103. However, a variety of other types of switches may be used for the main switch 106, including, for example, a normally-open relay or other switching devices having a relatively continuous voltage signal for turn-on and no voltage signal for turn-off, with the turn-on and turn-off voltage action being digitally controlled by the controller 102 and/or microcontroller unit 103.

According to the embodiment depicted in FIG. 1, the main switch 106 can include at least a first contact 140 and a second contact 142 between line and load sides 108, 110 of the GFCI circuit 100. However, according to certain embodiments, the main switch 106 may include other contacts in addition to the first and second contacts 140, 142, which can be used to control the delivery of power to other loads. According to the depicted embodiment, the first contact 140 is structured to selectively electrically couple the line hot input 126 to the load hot output 114. For example, when displaced from an open position, as depicted in FIG. 1, to a closed position, electrical current can flow from the line hot input 126 through the closed first contact 140 and to the load hot output 114. Similarly, the second contact 142 is structured to selectively electrically couple the line neutral input 128 to the load neutral output 116. Thus, when displaced from an open position, as depicted in FIG. 1, to a closed position, electrical current can flow from the load neutral output 116 through the closed second contact 142 and to the line neutral input 128.

Displacement of the first and second contacts 140, 142 is controlled by one or more signals outputted by the controller 102 and/or microcontroller unit 103. A variety of different mechanisms or components may be employed to initiate the opening and/or closing of the first and second contacts 140, 142. For example, according to the exemplary embodiment depicted in FIG. 1, the closing of the first and second contacts 140, 142 can be initiated by the operation of a first digital switch 144, for example, a transistor, and an associated first coil 146. Similarly, according to the exemplary embodiment depicted in FIG. 1, the opening of the first and second contacts 140, 142 can be initiated by the operation of a second digital switch 148, such as, for example, a transistor, and an associated second coil 150. Further, according to certain embodiments, the first and second digital switch 144, 148 can each include a signal ground 152, which can be electrically coupled to a resistor 154.

According to the depicted embodiment, the first digital switch 144 may receive a signal, such as, for example, a turn-on pulse, that is outputted from a first digital output (DO) 156 of the digital input/output device 138 of the controller 102, microcontroller unit 103, and/or GFCI 104. Such a signal from the controller 102, microcontroller unit 103, and/or GFCI 104 may be used to initiate the displacement of the first digital switch 144 to a closed position. With the first digital switch 144 in the closed position, electrical power that is provided to the main switch 106 from an associated voltage common collector (VCC) 160 may flow through the first coil 146 in a manner that generates a magnetic field or force that displaces the first and second contacts 140, 142 of the main switch 106 in a first direction ($D_1$ in FIG. 1) to their respective closed positions. Conversely, when the first and second contacts 140, 142 are to be displaced from the closed position to the open position, the second digital switch 148 may receive a signal, such as, for example, a turn-off pulse, that is outputted from a second digital output (DO) 162 of the digital input/output device 138 of the controller 102 and/or microcontroller unit 103 that can initiate the displacement of the second digital switch 148 to the closed position. With the second digital switch 148 in the closed position, electrical power provided to the main switch 106 from the associated voltage common collector (VCC) 160 may flow through the second coil 150 in a manner that generates a magnetic force or field that displaces the first and second contacts 140, 142 in a second direction ($D_2$ in FIG. 1) such that the first and second contacts 140, 142 of the main switch 106 are displaced to their respective open positions. Further, typically, when one of the first and second digital switches 144, 148 are in the closed position, the other of the first and second digital switches 144, 148 is in an open position.

The controller 102 can be adapted to control and monitor various operational aspects of the GFCI circuit 100, including the main switch 106, in a number of different manners. For example, according to certain embodiments, the controller 102 may execute operating logic 166 that defines various control, management, and/or regulation functions. The operating logic 166 may be in the form of one or more microcontroller or microprocessor routines stored in a non-transitory memory, dedicated hardware, such as a hardwired state machine, analog calculating machine, various types of programming instructions, and/or other forms. Additionally, as previously mentioned the controller 102 may be provided as a single component, or a collection of operatively coupled components, including, for example, a separate microcontroller unit 103 and GFCI IC 104. Further, the controller 102 can include multiple processing units arranged to operate independently, in a pipeline processing arrangement, in a parallel processing arrangement, or the like.

In the depicted form, the controller 102 and/or portions of the controller 102, such as, for example, the microcontroller unit 103, is of a programmable variety that executes algorithms and/or processes data in accordance with operating logic 166 as defined by programming instructions (such as software or firmware) stored in a memory 168 of the controller 102. Alternatively, or additionally, the operating logic 166 for the controller 102 and/or microcontroller unit 103 is at least partially defined by hardwired logic or other hardware. The controller 102 and/or microcontroller unit 103 may include one or more components of any type suitable to process the signals received from the digital input/output device 138 or elsewhere, and to provide desired output signals. Such components may include digital circuitry, analog circuitry, or a combination of both.

The memory 168 may be of one or more types, such as a solid-state variety, electromagnetic variety, optical variety, or a combination of these forms. Further, the memory 168 can be volatile, nonvolatile, or a combination of these types. In addition, the memory 168 can store data that is manipulated by the operating logic 166 of the controller 102 and/or microcontroller unit 103, such as data representative of signals received from and/or sent to the digital input/output device 138 in addition to or in lieu of storing programming instructions defining the operating logic 166, just to name one example. Further, the memory 168 may be included with the controller 102 and/or microcontroller unit 103, and/or can be coupled to the controller 102 and/or microcontroller unit 103.

The controller 102 and/or microcontroller unit 103 can also include one or more analog to digital converters (ADC) 170 that are adapted to assist the controller 102 and/or microcontroller unit 103 in sampling and monitoring of the status of the main switch 106 and/or the operation, including signals generated by, of the controller 102 and/or GFCI IC 104. For example, according to the embodiment depicted in FIG. 1, the ADC 170 is in electrical communication with an analog input (AI) 172 of the controller 102 and/or microcontroller unit 103 that receives a signal that is indicative of the voltage, if any, of the second coil 150 that is electrically coupled to the second digital switch 148. According to such an embodiment, the signal delivered to the analog input 172 may be delivered to the ADC 170 and used to sample the trip signal, if any, provided by the controller 102 and/or GFCI IC 104 at least during a self-test of the GFCI circuit 100 by the controller 102 and/or microcontroller unit 103 and/or during an actual fault. Similarly, the signal delivered to the ADC 170 may also be used by the controller 102 and/or microcontroller unit 103 to sample a voltage, if any, of the second coil 150 during generally normal or typical operating conditions of the GFCI circuit 100.

The digital input/output device 138 of the controller 102 and/or microcontroller unit 103 can further include a third digital output (DO) 174 that can be operated in connection with a signal outputted from the controller 102, microcontroller unit 103, and/or GFCI IC 104 that disables the trip action of the main switch 106. For example, referencing FIG. 1, the GFCI circuit 100 can include a test mode circuit 175 that includes a third digital switch 176 and a Zener diode 178 that are in electrical communication with the third digital output 174 of the controller 102 and/or microcontroller unit 103. According to such an embodiment, by electrically coupling the second, open coil 150 to the Zener diode 178, the controller 102 and/or microcontroller unit 103 can output a signal via the third digital output 174 to the third digital switch 176 in a manner that can utilize at least the Zener diode 178 to drop the voltage across the second, open coil 150 below a threshold trip voltage level, and thereby disable the trip action of the main switch 106. Moreover, according to certain embodiments, the inclusion of the Zener diode 178 may prevent the second digital switch 148 and/or second coil 150 from operating in a manner that could otherwise displace the first and second contacts 140, 142 of the main switch 106 to the open position.

The controller 102 and/or microcontroller unit 103 is further adapted to evaluate the condition of the GFCI circuit 100 through the use of a self-test feature that includes the use of a self-test circuit 180 of the GFCI circuit 100. According to the illustrated embodiment, the self-test circuit 180 includes a digital test switch 182 that is electrically coupled to the controller 102 and/or microcontroller unit 103 and the line hot input 126. The digital test switch 182 may also include a signal ground 184, which can be electrically coupled to a resistor 186. Certain embodiments of the self-test circuit 180 can include an output device 190, such as, for example, a light emitting diode 192, that can provide a visual or other indication that a self-test is in progress. Additionally, according to certain embodiments, the indication provided by the output device 190 can be distinct from an indication provided for other events. For example, according to certain embodiments, in the event that a manual test is initiated by the user at the same time as controller 102 and/or microcontroller unit 103 is conducting a self-test, the output device 190 can emit a light in a pattern, frequency, and/or color(s) that is distinct from the indication outputted by the output device 190 in response to an end of life or power on event/determination, among other indicators. During testing, the controller 102 and/or microcontroller unit 103 may output a digital test signal that closes the digital test switch 182 so as to connect the line hot input 126 to the ground 184, which according to certain embodiments, can be the common ground of the GFCI circuit 100, via the resistor 185 so as to create a test fault current through the controller 102 and/or GFCI IC 104, as detected using the sense and neutral coils 130a, 130b, as previously discussed. According to such an embodiment, the controller 102 and/or microcontroller unit 103 is adapted to monitor the response of the controller 102 and/or GFCI IC 104 to the self-generated test fault current. Such monitoring may include, but is not limited to, measuring, using a timer 186 of the controller 102 and/or microcontroller unit 103, a trip signal delay, and moreover, a delay in time generally between the closing of the digital test switch 182 and/or the sending of the signal for closing the digital test switch 182 and the detection of the trip signal from the controller 102 and/or GFCI IC 104 and/or the tripping of the GFCI circuit 100.

The controller 102 and/or microcontroller unit 103 can further be adapted to evaluate the results of the self-test to determine a health status of the GFCI circuit 100, such as, for example, whether the GFCI circuit 100 is in relatively satisfactory or unsatisfactory condition, which can include, for example, a determination of whether the GFCI circuit 100 has reached its end-of-life (EOL). Additionally, the controller 102 and/or microcontroller unit 103 may be adapted to provide instructions for a visual or audible communication of one or more health statuses of the GFCI circuit 100, as detected by the controller 102 and/or microcontroller unit 103. For example, according to certain embodiments, the GFCI circuit 100 may include an end of life (EOL) circuit 188 that can receive a health status signal from the controller 102 and/or microcontroller unit 103. The health status signal outputted from the controller 102 and/or microcontroller unit 103 can cause the EOL circuit 188 to operate an output device 190 in a manner that provides a visual and/or audible indication of the determined health status of the GFCI circuit 100. For example, according to certain embodiments, the output device 190 may be a light emitting diode 192 that is coupled to ground and to which the controller 102 and/or microcontroller unit 103 can, via the EOL circuit 188, selectively send a signal to provide a visual indication of the health status of the GFCI circuit 100, such as, for example, emitting a flashing or constant light in response to a determination by the controller 102 and/or microcontroller unit 103 that the GFCI circuit 100 has reached its end-of-life.

The GFCI circuit 100 can also include a manual test circuit 194, which may be operated by a user of the associated GFCI receptacle, socket, or outlet in connection with testing the operation of the GFCI circuit 100. According to the illustrated embodiment, the manual test circuit 194 includes a test switch or button 196 that may be manually operated or engaged by a user and which is in electrical communication with the line neutral input 128 and the load hot output 114. The GFCI circuit 100 may further include a manual reset circuit 198, which may include a reset switch or button 200 that is connected to a digital input (DI) 202 of the digital input/output device 138 of the controller 102 and/or microcontroller unit 103, and which is also connected to a ground 204. According to such an embodiment, manual activation of the reset switch or button 200 may provide an input to the controller 102 and/or microcontroller unit 103 that the controller 102 and/or microcontroller unit 103 can reference in determining whether to output a signal to close the first digital switch 144 so that a current is provided to the first coil 146 that is used to generate a magnetic force or field that is used to displace the first and second contacts 140, 142 of the main switch 106 to their respective closed positions.

Figure 2:
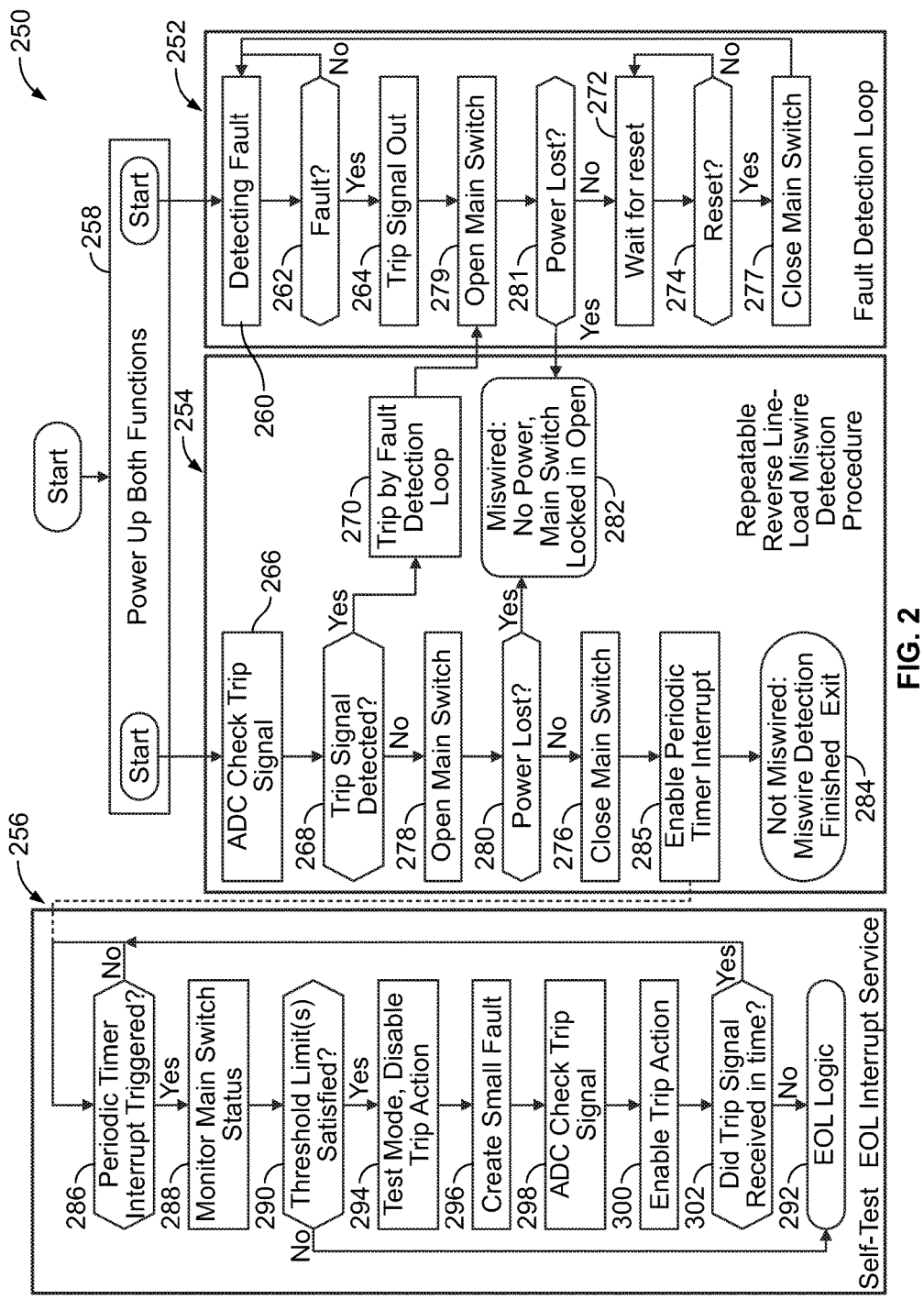
FIG. 2 illustrates a schematic flow diagram of an exemplary process of operation of a microcontroller unit for a digital ground-fault circuit interrupter.

FIG. 2 illustrates a schematic flow diagram of an exemplary process 250 of operation of a controller 102 and/or microcontroller unit 103 for a digital ground-fault circuit interrupter, including, for example, the GFCI circuit 100 depicted in FIG. 1. The operations illustrated for all of the processes in the present application are understood to be examples only, and operations may be combined or divided, and added or removed, as well as re-ordered in whole or in part, unless explicitly stated to the contrary. For reference, the process 250 is illustrated in terms of three components, namely, a fault detection process 252, a repeatable miswire detection process 254, and a self-test and end of life interrupt service process 256.

At step 258, at least the internal power circuit 112 of the GFCI circuit 100 may be powered up, such as, for example, receiving power from the line hot input 126 and line neutral input 128 of the line side 108 of the GFCI circuit 100. As previously mentioned, according to certain embodiments, the internal power circuit 112 is wired on the line side 108, power from the power up of step 258 can power up the internal power circuit 112, which can thereby provide power to the controller 102, which can, again, be adapted to include, or perform the functionalities of, a microcontroller unit 103 and a GFCI IC 104. At step 260, upon being supplied with electrical power, the controller 102 and/or GFCI IC 104 may begin monitoring for the occurrence or presence of a fault. For example, as previously discussed, at step 260, the comparator circuit 124 may at least receive and/or compare current information obtained from the sense and neutral coils 130a, 130b. At step 262, the controller 102 and/or GFCI IC 104, which, according to certain embodiments, can operate independently of the controller 102 and/or microcontroller unit 103, may determine whether the information detected or determined by the comparator circuit 124 indicates the presence or occurrence of a fault. If no fault is detected, then the controller 102 and/or GFCI IC 104 may continue monitoring at step 260 the information provided by the comparator circuit 124, and moreover the information detected by the sense and neutral coils 130a, 130b. Further, such monitoring for a fault by the controller 102 and/or GFCI IC 104 may be relatively continuous. Moreover, for example, according to certain embodiments the controller 102 and/or GFCI IC 104 can continue to operate and monitor for the presence of a fault as long as the controller 102 and/or GFCI IC 104 continues to receive electrical power and is supplied with electrical power via the example internal power circuit 112. If, however, a fault is detected or determined at step 262, the controller 102 and/or GFCI IC 104 may provide a trip signal at step 264 that opens the main switch 106 at step 279. For example, according to certain embodiments, upon detection of a fault, the controller 102 and/or GFCI IC 104 can output a trip signal from a silicon controlled rectifier (SCR) driven by the controller 102 and/or GFCI IC 104 that initiates the first and second contacts 140, 142 of the main switch 106 being displaced to open positions at step 279. As indicated by FIG. 2 and discussed below, the trip signal outputted by the controller 102 and/or GFCI IC 104 may also be used in operations relating to the repeatable miswire detection process 254 and the self-test with end of life interrupt service process 256.

With respect to repeatable miswire detection process 254, also referred to as repeatable reverse line-load miswire detection, miswire detection can be realized by the controller 102 and/or microcontroller unit 103 via open-then-close operation of the main switch 106 following the power up of the GFCI circuit 100 at step 258. For example, upon powering up at least the internal power circuit 112 at step 258, the controller 102 and/or microcontroller unit 103 can, at step 266, sample, or monitor for presence of, a trip signal, such as, for example, a trip signal from the controller 102 and/or GFCI IC 104. For example, the controller 102 and/or microcontroller unit 103 can monitor for the presence of at least an initial sample of a trip signal that may have been outputted by, for example, the controller 102 and/or GFCI IC 104 at step 266. As previously discussed, according to certain embodiments, the controller 102 and/or controller 102 and/or GFCI IC 104 can be adapted to output a trip signal if there is a fault in the GFCI circuit 100 during the power up that occurs at step 258, the outputted trip signal being received by the analog input (AI) 172 of the controller 102 and/or microcontroller unit 103. According to such an embodiment, the analog trip signal that is received by the controller 102 and/or microcontroller unit 103 can be provided to an analog to digital converter (ADC) 170 and subsequently evaluated by the controller 102 and/or microcontroller unit 103.

Accordingly, at step 268, the controller 102 and/or microcontroller unit 103 can determine whether a trip signal was detected by the controller 102 and/or microcontroller unit 103 at step 266. If a trip signal was detected, then at step 270 the controller 102 and/or microcontroller unit 103 can wait for the main switch 106 to be tripped by the controller 102 and/or GFCI IC 104. Further, at step 272, the controller 102 and/or microcontroller unit 103 can wait for activation of the manual reset of the main switch 106, which can, according to certain embodiments, be achieved by manual activation of the reset switch 200 of the manual reset circuit 198. Accordingly, at step 274, the controller 102 and/or microcontroller unit 103 can determine whether the manual reset has occurred. If the manual reset has not yet occurred, the controller 102 and/or microcontroller unit 103 may continue to wait and monitor for the occurrence of the manual reset. If, however, the controller 102 and/or microcontroller unit 103 determines at step 274 that a manual reset has occurred, then at step 277 the controller 102 and/or microcontroller unit 103 can output a signal to close the first digital switch 144 so that a current is provided to the first coil 146 that is used to generate a magnetic force or field that causes the closing of the first and second contacts 140, 142 of the main switch 106.

If however at step 266 the controller 102 and/or microcontroller unit 103 determines that the controller 102 and/or microcontroller unit 103 has not detected a trip signal from the controller 102 and/or the GFCI IC 104, and thus there is no indication of a fault during power up of the GFCI circuit 100, then at step 278 the controller 102 and/or microcontroller unit 103 can output a signal to close the second digital switch 148. Again, according to the depicted embodiment, such closing of the second digital switch 148 can result in current flowing through the second coil 150 so as to generate a magnetic field or force that is used to open the first and second contacts 140, 142 of the main switch 106.

At step 280, with the main switch 106 open, the controller 102 and/or microcontroller unit 103 may determine whether power is, or is not, flowing through at least the internal power circuit 112. Moreover, the absence of power in the internal power circuit 112, and thus the absence of a supply of electrical power to the controller 102 and/or microcontroller unit 103, can indicate, at step 280, that the GFCI circuit 100 is miswired, such as, for example, miswired on its load side 110. In such a situation, the main switch 106 may remain in an open position, thereby causing a locking out of the miswired GFCI circuit at step 282. For example, when the external power source is miswired on the load side 110 and the first and second contacts 140, 142 of the main switch 106 are in the open position before power up, the entire GFCI circuit 100 may not be powered up during the power up of step 258. In such a situation, the main switch 106 will remain in the open position, as electrical power is not being supplied to at least the internal power circuit 112, and thus no power is being supplied to at least the controller 102 and/or microcontroller unit 103, the first digital switch 144, and the first coil 146 that could be used to initiate the displacement of the first and second contacts 140, 142 of the main switch 106 to the closed position. Conversely, if the main switch 106 is in closed position before power up, the GFCI circuit 100, including the internal power circuit 112, will be powered up at step 258, and moreover will be able to receive power that is delivered to the GFCI circuit from the external power source 125. Following the power up at step 258, and when in the absence of a detected fault, the controller 102 and/or microcontroller unit 103 will open the first and second contacts 140, 142 of the main switch 106 at step 278, when in presence of a detected fault, the controller 102 and/or microcontroller unit 103 can also open the first and second contacts 140, 142 or the main switch 106 at step 279. However, if the external power source is miswired on the load side 110, the GFCI circuit 100 will lose power at either step 280 if there is no during power up at step 258 or step 281 if there is a fault during power up at step 258, and thus electrical power will not be available for the execution of a closing action of the main switch 106 at either step 276 or step 272 through 277. Accordingly, in such a situation, with the internal power circuit 112 miswired to the load side 110, and with the main switch 106 in the open position, power is not provided to at least the internal power circuit 112, and thus the controller 102 and/or microcontroller unit 103 is unable to execute a closing action of the main switch 106, and the main switch 106 therefore remains in the open position. Accordingly, the GFCI circuit 100 will not deliver electrical power, thereby again resulting in the locking out of the GFCI circuit 100, as indicated by step 282. Further, the main switch 106 can remain in the lock-out position until the user or installer correctly rewires the GFCI circuit 100.

If however electrical power is detected at step 280, and with the main switch 106 in an open position, and in absence of a detected fault, at step 276, the controller 102 and/or microcontroller unit 103 may issue a signal that is used to initiate the closing of the main switch 106 such that electrical power can, if the GFCI circuit 100 is properly wired, flow to the load side 110 of the GFCI circuit 100. For example, according to the illustrated embodiment, at step 276, the controller 102 and/or microcontroller unit 103 may output a signal that closes the first digital switch 144 such that electrical current flows through the first coil 146 in a manner that generates a magnetic field or force that initiates the closing of the first and second contacts 140, 142 of the main switch 106. The GFCI circuit 100 can then enable the periodic timer interrupt for self-test at step 285 and exit the miswire detection operation and enter into a normal operation cycle at step 284. Additionally, according to certain embodiments, at step 284, the repeatable miswire detection process 254 will proceed to a wait loop, during which the repeatable miswire detection process 254 will wait for a subsequent power up of the GFCI circuit 100, such as, for example, another power up at step 258.

The self-test with end of life interrupt service process 256 can be achieved by the logic and control procedure of the controller 102 and/or microcontroller unit 103, and can be initiated in a number of manners. For example, according to certain embodiments, the self-test with end of life interrupt service process 256 can be initiated at step 285 by enabling the timer interrupt of the controller 102 and/or microcontroller unit 103, as indicated by FIG. 2. Further, according to certain embodiments, the timer 186 of the controller 102 and/or microcontroller unit 103 can periodically invoke the process 256 at step 286, such as, for example, at certain predetermined time intervals. During the self-test process, the controller 102 and/or microcontroller unit 103 can, at step 288, sample the status of one or more characteristics of the main switch 106 and/or the GFCI circuit 100 to make sure the main switch 106 and/or the GFCI circuit 100 is operable and/or satisfies certain threshold values or limits. A variety of different characteristics, or combinations of characteristics, may be sampled at step 288. For example, according to embodiments in which the main switch 106 is a relay or other switching devices, characteristics of the main switch 106 that may be sampled can include a relay coil voltage.

At step 290, the controller 102 and/or microcontroller unit 103 can evaluate whether the one or more characteristics sampled at step 288 do, or do not, fall within or satisfy threshold limits for those characteristics that are associated with generally normal operation of that particular component of the GFCI circuit 100, and/or are associated with generally normal overall operation of the GFCI circuit 100. For example, according to an embodiment in which the main switch 106 is a relay or other switching devices, the controller 102 and/or microcontroller unit 103 may compare the sampled relay coil voltage with a threshold relay coil voltage, or range of threshold relay coil voltages, that is/are associated with generally normal operation of the main switch 106. A determination by the controller 102 and/or microcontroller unit 103 that the evaluation from step 290 indicates the sampled characteristic(s) is/are outside of, or abnormal in view of, the threshold value, or range of values, can lead to the controller 102 and/or microcontroller unit 103 determining at step 292 that the GFCI circuit 100 has reached its end-of-life. Such monitoring at step 290 can occur both during normal operation of the GFCI circuit 100, as well as during testing of the GFCI 100.

Conversely, if the controller 102 and/or microcontroller unit 103 determines the one or more sampled characteristics are within or satisfy the threshold value(s), the controller 102 and/or microcontroller unit 103 may determine that the main switch 106 status is normal. In such a situation, at step 294, the controller 102 and/or microcontroller unit 103 can output a test mode signal, such as, for example, via the test mode circuit 175, that temporarily disables the normal tripping capabilities of the main switch 106 for a relatively very short period which, for example, disables the ability of a trip signal from the controller 102 and/or GFCI IC 104 to trip the main switch. However, the controller 102 and/or microcontroller unit 103 can be adapted such that the duration of the self-test period is short enough to preserve the tripping curve for various current levels when factoring typical detection time of the controller 102 and/or GFCI IC 104. At step 296, using the self-test circuit 180, the controller 102 and/or microcontroller unit 103 can output a self-test signal that initiates the connection of the line hot input 126 to the ground 184 of the self-test circuit 180, which, again, can be the common ground of the GFCI circuit 100, via the resistor 185 so as to create a test fault current through sense and neutral coils 130a, 130b.

As previously discussed with respect to the fault detection process 252, at step 260, in response to the detection of a test fault, the controller 102 and/or GFCI IC 104 can output a trip signal at step 264 that is to open the main switch 106. However, as previously mentioned, in such a situation, normal tripping of the main switch 106 was disabled at step 294. Accordingly, the trip signal outputted at step 264 during the self-test typically does not trip the main switch 106. However, at step 298, the trip signal outputted by the controller 102 and/or GFCI IC 104 can be received in the analog input (AI) 172, and sampled by the ADC 170, of the controller 102 and/or microcontroller unit 103, thereby allowing the controller 102 and/or microcontroller unit 103 to test the function and operation of the GFCI circuit 100, and particularly the response and operation of the controller 102 and/or GFCI IC 104, without actually tripping the GFCI circuit 100. Further, upon detection by the controller 102 and/or microcontroller unit 103 of the trip signal outputted from the controller 102 and/or GFCI IC 104, at step 300 the controller 102 and/or microcontroller unit 103 can disable the test mode circuit 175 such that the ability of the controller 102 and/or GFCI IC 104 to trip the main switch 106 is restored.

At step 302, the controller 102 and/or microcontroller unit 103 can determine whether the GFCI circuit 100 did, or did not, satisfy the self-test, which can include the controller 102 and/or microcontroller unit 103 monitoring and evaluating the response and operation of the controller 102 and/or GFCI IC 104 to the self-test fault. For example, according to certain embodiments, using the timer 186 of the controller 102 and/or microcontroller unit 103, the controller 102 and/or microcontroller unit 103 may determine a lapsed time before the trip signal outputted by the controller 102 and/or GFCI IC 104 was, or was not, sensed by the controller 102 and/or microcontroller unit 103. Further, the controller 102 and/or microcontroller unit 103 may determine whether the period of time that lapsed before the controller 102 and/or microcontroller unit 103 sensed the trip signal outputted by the controller 102 and/or GFCI IC 104 was, or was not, within a predefined timeout threshold. In the event that the elapsed time before the controller 102 and/or microcontroller unit 103 sensed the trip signal falls within, or otherwise satisfies the predefined timeout threshold, the controller 102 and/or microcontroller unit 103 may determine that the GFCI circuit 100 passed the self-test. However, if the lapsed time before the controller 102 and/or microcontroller unit 103 sensed the trip signal does not fall within, or otherwise does not satisfy the predefined timeout threshold, the controller 102 and/or microcontroller unit 103 may determine that the GFCI circuit 100 has failed the self-test. Additionally, according to certain embodiments, the controller 102 and/or microcontroller unit 103 may determine that the controller 102 and/or microcontroller unit 103 did not receive or detect the trip signal outputted by the controller 102 and/or GFCI IC 104, in which case the controller 102 and/or microcontroller unit 103 can determine that the GFCI circuit 100 failed the self-test.

If the controller 102 and/or microcontroller unit 103 determines that the GFCI circuit 100 did not fail the self-test, the controller 102 and/or microcontroller unit 103 may determine that the controller 102 and/or GFCI IC 104 is operating normally and/or has a relatively healthy component health status. In such a situation, the self-test with end of life interrupt service process 256 can return to step 286 and await another initiation of the self-test with end of life interrupt service process 256. If, however, at step 302, the controller 102 and/or microcontroller unit 103 determines that the GFCI circuit 100 failed the self-test, then at step 292, the controller 102 and/or microcontroller unit 103 can proceed to the end-of-life stage. According to certain embodiments, at the end-of-life stage, the controller 102 and/or microcontroller unit 103 can continuously output an "open switch" signal to the main switch 106, which can retain the first and second contacts 140, 142 of the main switch 106 in the open position as well as disable other functions of the GFCI circuit 100. Alternatively, according to certain embodiments, the "open switch" signal may be communicated to an end of life redundant component or circuit of the GFCI circuit 100, as well as, again, disable other functions of the GFCI circuit 100. Additionally, the controller 102 and/or microcontroller unit 103 can output an end-of-life signal via the output device 190 of the EOL circuit 188, which can provide a visual and/or audible indication for users of the EOL health status of the GFCI circuit 100 and/or related GFCI outlet, socket, or receptacle.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A ground fault circuit interrupter circuit comprising:
one or more line side connection terminals configured to be connected to an external power source;
one or more load side connection terminals configured to be connected to an external load;
a main switch having one or more contacts, the one or more contacts being selectively displaceable between an open position and a closed position to electrically couple/de-couple the said one or more line side connection terminals to/from the one or more load side connection terminals;
a self-test circuit adapted to create a test fault in the ground fault circuit interrupter circuit;
a controller adapted to output a trip signal in response to the test fault;
an internal power supply in electrical communication with the one or more line side connection terminals and at least the controller, the internal power supply being unable to supply electrical power to at least the controller when the external power source is connected to the one or more load side connection terminals rather than connected to the one or more line side connection terminals while the one or more contacts of the main switch are in the open position; and a test mode circuit adapted to issue a disable signal to prevent the one or more contacts of the main switch from being tripped from the closed position to the open position by a test trip signal, the controller issuing a test fault signal in response to the disable signal to generate a test fault in the ground fault circuit interrupter circuit, the controller further issuing the test trip signal in response to the test fault generated in the ground fault circuit interrupter circuit, wherein the controller is adapted to monitor one or more characteristics relating to the test fault generated within the ground fault circuit interrupter circuit.

2. The ground fault circuit interrupter circuit of claim 1, wherein the main switch includes a coil adapted to displace the one or more contacts from the closed position to the open position when a voltage level across the coil is at least at a threshold trip voltage, and wherein the controller is further adapted to output a signal to close a test switch of the test mode circuit, causing the voltage level across the coil dropping below the threshold trip voltage when the test switch is closed.

3. The ground fault circuit interrupter circuit of claim 2, wherein the test mode circuit includes a Zener diode adapted to drop the voltage level across the coil below the threshold trip voltage.

4. The ground fault circuit interrupter circuit of claim 3, wherein the test trip signal outputted by the controller closes the test switch, and wherein, when the test switch is closed, the Zener diode is connected in parallel with the coil to drop the voltage level across the coil below the threshold trip voltage.

5. The ground fault circuit interrupter circuit of claim 1, wherein the one or more characteristics includes a detection of the test trip signal by the controller.

6. The ground fault circuit interrupter circuit of claim 5, wherein the controller includes a timer, and wherein the one or more characteristics includes a time between issuance of the test fault signal and the detection of the test trip signal by the controller.

7. The ground fault circuit interrupter circuit of claim 1, wherein the controller is further adapted to compare the monitored one or more characteristics to a threshold value and provide at least one of a visual and audible indication of a result of the comparison by operation of an output device of an end of life circuit of the ground fault circuit interrupter circuit.

8. The ground fault circuit interrupter circuit of claim 7, wherein the output device is a light emitting diode, and wherein the controller outputs a signal to emit light from the light emitting diode at least when the one or more characteristics does not satisfy the threshold value.

9. The ground fault circuit interrupter circuit of claim 8, wherein the controller includes a ground fault circuit interrupter circuit integrated circuit and a microcontroller unit.

10. A ground fault circuit interrupter circuit comprising:
a main switch adapted for selective control of a flow of electrical power between a line side to a load side of the ground fault circuit interrupter circuit when the main switch is in a closed position, and to prevent the flow of electrical power between the load side and the line side when the main switch is in an open position; and
a controller adapted to, upon an initial power up of the controller, transmit a first signal to initiate the main switch being changed from the closed position to the open position, wherein, when the main switch is changed to the open position in response to the transmission of the first signal and the external power source is electrically coupled to the line side of the ground fault circuit interrupter circuit, the controller is adapted to receive electrical power to generate a second signal to initiate the main switch being returned from the open position to the closed position, and wherein, when the main switch is changed to the open position in response to the transmission of the first signal and the external power source is electrically coupled to the load side rather than the line side of the ground fault circuit interrupter circuit, the controller does not receive electrical power to generate the second signal.

11. The ground fault circuit interrupter circuit of claim 10, further including an internal power supply connected to the line side and configured to receive electrical power from an external power source, the internal power supply electrically coupled to the controller, wherein the ground fault circuit interrupter is configured for the internal power supply to not receive electrical power from the external power source when the external power source is connected to the load side and the main switch is in the open position, and wherein the controller is configured to control the placement of the main switch in the open and closed positions when the controller receives a supply of electrical power from the internal power supply, and further wherein the controller ceases to receive the supply of electrical power from the internal power supply when the external power source is connected to the load side and the main switch is in the open position.

12. The ground fault circuit interrupter circuit of claim 11, wherein the main switch is a dual coil relay having a first coil and a second coil, and wherein the ground fault circuit interrupter further includes a control circuit having a first digital switch and a second digital switch, the first digital switch being electrically coupled to the first coil and adapted to, in response to the first signal, generate a magnetic field that displaces one or more contacts of the dual coil relay to a closed position, the second digital switch being electrically coupled to the second coil and adapted to, in response to the second signal, generate a magnetic field that displaces the one or more contacts of the dual coil relay to an open position.

13. The ground fault circuit interrupter circuit of claim 10, wherein the controller includes a ground fault circuit interrupter circuit integrated circuit and a microcontroller unit, and further wherein the controller is adapted to, upon power up, monitor for the presence of a trip signal from the controller, and, upon the absence of a detection of the trip signal, transmit the first signal.

14. A ground fault circuit interrupter circuit comprising:
a main switch electrically coupled to a line side and a load side, the main switch having one or more contacts, the one or more contacts being selectively displaceable between an open position and a closed position, an electrical power flow through the main switch from the line side to the load side when the one or more contacts are in the closed position, the electrical power not being delivered through the main switch to the load line when the one or more contacts are in the open position;
a controller adapted to output a trip signal in response to detection of a fault by the controller to initiate the displacement of the one or more contacts from the closed position to the open position, the controller further adapted to output a first and a second signal, the first signal initiating the displacement of the one or more contacts from the closed position to the open position, the second signal initiating the displacement of the one or more contacts from the open position to the closed position;

wherein the controller includes a ground fault circuit interrupter integrated circuit and a microcontroller unit, the microcontroller unit providing a signal to close a test switch of a test mode circuit, the test mode circuit adapted to, when the test switch is closed, prevent the displacement of the one or more contacts from the closed position to the open position by the trip signal.

15. The ground fault circuit interrupter circuit of claim 14, further including an internal power supply circuit connected to a line side and having an AC to DC converter, the internal power supply circuit adapted to deliver electrical power from the line side to at least the controller.

16. The ground fault circuit interrupter circuit of claim 15, wherein the microcontroller unit is adapted to monitor one or more characteristics of the main switch and compare the one or more characteristics to one or more threshold characteristic values.

17. The ground fault circuit interrupter circuit of claim 16, wherein the one or more characteristics includes a voltage across the main switch.

18. The ground fault circuit interrupter circuit of claim 15, wherein the trip signal is an analog or digital signal, and further wherein the microcontroller unit includes a signal input for receipt of the trip signal, the microcontroller unit further having an analog to digital or digital to analog converter to convert the trip signal received by the signal input to an analog or digital signal.

19. The ground fault circuit interrupter circuit of claim 14, wherein the microcontroller unit is adapted to provide a signal to a self-test circuit to create a test fault in the ground fault interrupter circuit, and wherein the ground fault circuit interrupter integrated circuit is adapted to detect the test fault and output the trip signal in response to the test fault, and wherein the microcontroller unit is further adapted to monitor one or more characteristics of the trip signal that is outputted in response to the test fault.

* * * * *